US012121490B2

(12) United States Patent
Goffer et al.

(10) Patent No.: US 12,121,490 B2
(45) **Date of Patent: *Oct. 22, 2024**

(54) LOCOMOTION ASSISTING APPARATUS WITH INTEGRATED TILT SENSOR

(71) Applicant: ReWalk Robotics LTD., Yokneam (IL)

(72) Inventors: Amit Goffer, Kiryat Tivon (IL); Oren Tamari, Pardesia (IL)

(73) Assignee: ReWalk Robotics LTD., Yokneam (IL)

( * ) Notice: Subject to any disclaimer, the term of this patent is extended or adjusted under 35 U.S.C. 154(b) by 372 days.

This patent is subject to a terminal disclaimer.

(21) Appl. No.: 17/107,453

(22) Filed: Nov. 30, 2020

(65) Prior Publication Data

US 2021/0290471 A1 Sep. 23, 2021

Related U.S. Application Data

(63) Continuation of application No. 15/136,844, filed on Apr. 22, 2016, now Pat. No. 10,849,816, which is a (Continued)

(51) Int. Cl.
*A61H 3/00* (2006.01)
*A61H 1/02* (2006.01)

(52) U.S. Cl.
CPC ............... *A61H 3/00* (2013.01); *A61H 1/024* (2013.01); *A61H 1/0244* (2013.01); (Continued)

(58) Field of Classification Search
CPC . A61H 3/00; A61H 3/06; A61H 3/061; A61H 1/0262; A61H 1/024; A61H 1/0244; A61H 2201/5069
See application file for complete search history.

(56) References Cited

U.S. PATENT DOCUMENTS 5,252,102 A * 10/1993 Singer .................. G05B 19/408 623/24
7,153,242 B2 * 12/2006 Goffer .................. A61F 5/0102 482/66

(Continued)

FOREIGN PATENT DOCUMENTS

JP 2007130234 A 5/2007
JP 2010148637 A 7/2010

(Continued)

OTHER PUBLICATIONS

Extended European Search Report for Application No. EP22159563, mailed on Oct. 4, 2022, 8 pages.

(Continued)

*Primary Examiner* — Colin W Stuart
*Assistant Examiner* — Douglas Y Sul
(74) *Attorney, Agent, or Firm* — COOLEY LLP

(57) ABSTRACT

A locomotion assisting exoskeleton device includes a plurality of braces, including a trunk support for affixing to the part of the torso of a person and leg segment braces each leg segment brace for connecting to a section of a leg of the person. The device further includes at least one motorized joint for connecting two of the braces and for providing relative angular movement between the two braces. The device includes at least one tilt sensor mounted on the exoskeleton device for sensing a tilt of the exoskeleton, and a controller for receiving sensed signals from the tilt sensor and programmed with an algorithm with instructions for actuating the motorized joints in accordance with the sensed signals.

15 Claims, 4 Drawing Sheets

Related U.S. Application Data continuation of application No. 12/909,746, filed on Oct. 21, 2010, now abandoned.

(52) U.S. Cl.
CPC .. *A61H 2003/007* (2013.01); *A61H 2201/165* (2013.01); *A61H 2201/5002* (2013.01); *A61H 2201/5058* (2013.01); *A61H 2201/5069* (2013.01); *A61H 2201/5071* (2013.01); *A61H 2201/5097* (2013.01)

(56) References Cited

U.S. PATENT DOCUMENTS

| | | | | |
|---|---|---|---|---|
| 7,278,954 | B2 | 10/2007 | Kawai et al. | |
| 7,628,766 | B1 * | 12/2009 | Kazerooni | A61F 5/00 601/5 |
| 7,998,096 | B1 | 8/2011 | Skoog | |
| 8,096,965 | B2 | 1/2012 | Goffer et al. | |
| 10,849,816 | B2 * | 12/2020 | Goffer | A61H 1/0244 |
| 2004/0158175 | A1 | 8/2004 | Ikeuchi et al. | |
| 2004/0167641 | A1 * | 8/2004 | Kawai | B25J 9/0006 700/63 |
| 2007/0123997 | A1 * | 5/2007 | Herr | A61F 2/60 602/23 |
| 2007/0204687 | A1 | 9/2007 | Haselhurst et al. | |
| 2009/0131839 | A1 * | 5/2009 | Yasuhara | A61H 3/008 601/5 |
| 2010/0094188 | A1 | 4/2010 | Goffer et al. | |
| 2010/0130894 | A1 * | 5/2010 | Ikeuchi | A61H 3/00 601/34 |
| 2016/0235616 | A1 | 8/2016 | Goffer et al. | |

FOREIGN PATENT DOCUMENTS

| | | | |
|---|---|---|---|
| JP | 2010162064 | A | 7/2010 |
| RU | 2118147 | C1 | 8/1998 |
| WO | WO-2009082249 | A2 | 7/2009 |

OTHER PUBLICATIONS

International Search Report mailed Jan. 8, 2013, for PCT/IL2011/000799.

Japanese Office Action mailed Feb. 4, 2014, for Application No. 2013-5834456.

Supplementary European Search Report for Application No. 11833961.3, mailed on Apr. 4, 2014.

* cited by examiner

LOCOMOTION ASSISTING APPARATUS WITH INTEGRATED TILT SENSOR

CROSS-REFERENCE TO RELATED PATENT APPLICATIONS

This patent application is a continuation of and claims priority to and the benefit of U.S. patent application Ser. No. 15/136,844, filed Apr. 22, 2016 entitled "Locomotion Assisting Apparatus with Integrated Tilt Sensor", which is a continuation of U.S. patent application Ser. No. 12/909,746, filed Oct. 21, 2010 and entitled "Locomotion Assisting Apparatus With Integrated Tilt Sensor". Each disclosure is hereby incorporated by reference in its entirety.

FIELD OF THE INVENTION

The present invention relates to assisted walking devices. More particularly, the present invention relates to a locomotion assisting apparatus with an integrated tilt sensor.

BACKGROUND OF THE INVENTION

A motorized locomotion assistance exoskeleton device may assist locomotion of a person with a disability in the lower portion of the body. For example, such a device may assist a disabled user to walk or perform other tasks that ordinarily require use of the legs. Such devices have been described, for example, by Goffer in U.S. Pat. No. 7,153,242 and by Goffer et al. in US 2010/0094188.

A device as described typically is designed to be attached to parts of the lower portion and part of the trunk of a person's body. Such a described device typically includes motorized joints and actuators for flexing and extending the parts of the body to which it is attached. Such a described device typically includes sensors for ascertaining the state of the device and the body during locomotion. For example, a described device may include one or more angle sensors for measuring angles of the joints, tilt sensors for measuring a tilt angle of the body, and pressure or force sensors for measuring the force exerted on the ground or other surface.

Such a described device may include various controls for controlling the device. For example, the device typically includes a mode selection device for selecting a mode of operation, for example, a gait. Typically, a controller that controls operation of the device is designed to receive signals from the device sensors, and to control operation of the device on the basis of the received sensor signals. For example, the sensor signals may indicate whether a gait or action being performed by the device is proceeding as expected. In addition, a user to whom the device is attached may deliberately perform an action that affects a reading of one or more sensors. The controller may be programmed to initiate, continue, or discontinue performance of an action based on the sensor readings. Thus, the person may at least partially control operation of the device by leaning or performing other actions that may affect sensor readings.

Continuing study and experience with the design and use of motorized locomotion assistance exoskeleton devices have led to increased understanding of their operation. It is an object of the present invention to provide a motorized locomotion assistance exoskeleton device with a novel design based on this increased understanding.

Other aims and advantages of the present invention will become apparent after reading the present invention and reviewing the accompanying drawings.

SUMMARY OF THE INVENTION

There is thus provided, in accordance with some embodiments of the present invention, a locomotion assisting exoskeleton device. The device includes a plurality of braces including a trunk support for affixing to the part of the torso of a person and leg segment braces each leg segment brace for connecting to a section of a leg of the person. The device also includes at least one motorized joint for connecting two braces of said plurality of braces and for providing relative angular movement between the two braces; at least one tilt sensor mounted on the exoskeleton device for sensing a tilt of the exoskeleton; and a controller for receiving sensed signals from the tilt sensor, and programmed with an algorithm with instructions for actuating the motorized joints in accordance with the sensed signals.

Furthermore, in accordance with some embodiments of the present invention, the device includes a remote control.

Furthermore, in accordance with some embodiments of the present invention, the algorithm comprises operating the motorized joint to swing a trailing leg forward when a sensed tilt sensed by the tilt sensor exceeds a threshold value.

Furthermore, in accordance with some embodiments of the present invention, the algorithm comprises operating the motorized joint to extend a leading leg backward when a sensed tilt sensed by the tilt sensor exceeds a threshold value.

Furthermore, in accordance with some embodiments of the present invention, the tilt sensor is mounted on the trunk support.

Furthermore, in accordance with some embodiments of the present invention, the tilt sensor is mounted on a component of the exoskeleton device whose tilt is substantially equal to the tilt of the trunk support.

Furthermore, in accordance with some embodiments of the present invention, a joint is provided with an angle sensor for sensing an angle between the two braces connected by the joint.

Furthermore, in accordance with some embodiments of the present invention, the algorithm includes instructions for actuating the motorized joints in accordance with the sensed angle.

Furthermore, in accordance with some embodiments of the present invention, the algorithm includes halting forward motion of a leg when the sensed angle is within a predetermined range of angles.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF EMBODIMENTS

Figure 1A:
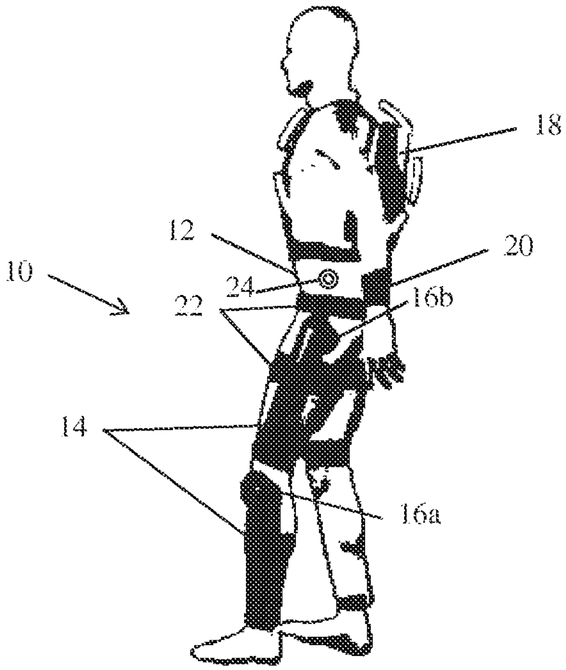
FIG. 1A is a side view of a locomotion assisting exoskeleton device in accordance with some embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

A locomotion assisting exoskeleton device in accordance with embodiments of the present invention typically includes one or more braces or supports. Each brace may be strapped on, or otherwise attached to, a part of the body of the user. Typically, one or more trunk supports may be attached to the trunk, in particular, the lower torso, of the user. Other braces may be attached to sections of the user's legs. Each brace or support of the apparatus is typically joined via a joint or other connection to one or more other components of the apparatus. A joint may enable relative movement between the joined components. For example, a joint may enable relative motion between a brace and an adjacent brace.

The locomotion assisting exoskeleton device may include one or more motorized actuation assemblies. A motorized actuation assembly may be operated to move one or more parts of the user's body. For example, a motorized actuation assembly may bend a joint. Coordinated bending of one or more joints may propel one or more limbs of the user's body.

Typically, a joint may be provided with one or more sensors for sensing the relative positions and orientations of various components of the apparatus. The relative positions of components of the apparatus may indicate the relative positions of body parts to which the components are attached. For example, a sensor may measure and generate a signal indicating, for example, the angle between two braces joined at a joint. The locomotion assisting exoskeleton device includes one or more tilt sensors. Experience acquired with regard assisted walking with an exoskeleton device has shown that a forward tilt of a user wearing the exoskeleton device may be effectively utilized for operation of the device. For example, a forward tilt of the user may indicate that the user wants to walk forward. For example, when the user is tilting forward, the apparatus may be operated to initiate a forward step. For example, walking forward may include a repeated sequence of leg swings. A leg swing may include a sequence of operations that includes raising a trailing leg, extending the raised leg forward, and lowering the leg. Typically, user's hands may move forward to cause a forward tilt (or "prevented fall"), raising a trailing leg from the ground. When the trailing leg is clear of the ground, the exoskeleton device may initiate a the above sequence of operations. The above sequence of operation may thus swinging the initially trailing leg forward to rest on the ground at a point ahead of the initially leading leg. In this manner, the apparatus may assist the user to walk forward.

Therefore, a tilt sensor of a locomotion assisting exoskeleton device in accordance with embodiments of the present invention is located on a part of the apparatus that tilts with the device. For example, the tilt sensor may be located on a brace of the apparatus that is designed to attach to the lower or upper torso of the user. For example, the tilt sensor may be mounted on a side, back, or front panel of a trunk support designed to be attached to the user's lower torso. The tilt sensor may alternatively be mounted on any component of the exoskeleton device that is substantially rigidly attached to such a brace. For example, a backpack of the exoskeleton device may be rigidly attached to a trunk support, or attached via a substantially rigid connector that enables no more than a small amount of give. In such a case, the tilt sensor may be mounted on or within the backpack.

Figure 1B:
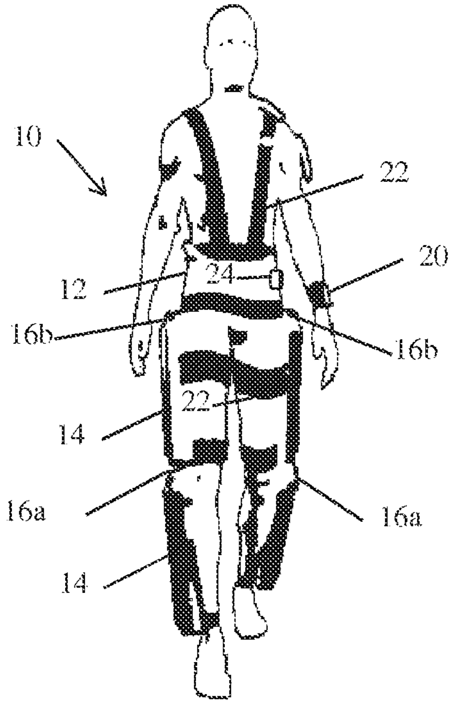
FIG. 1B is a front view of the apparatus shown in FIG. 1A.
Figure 1C:
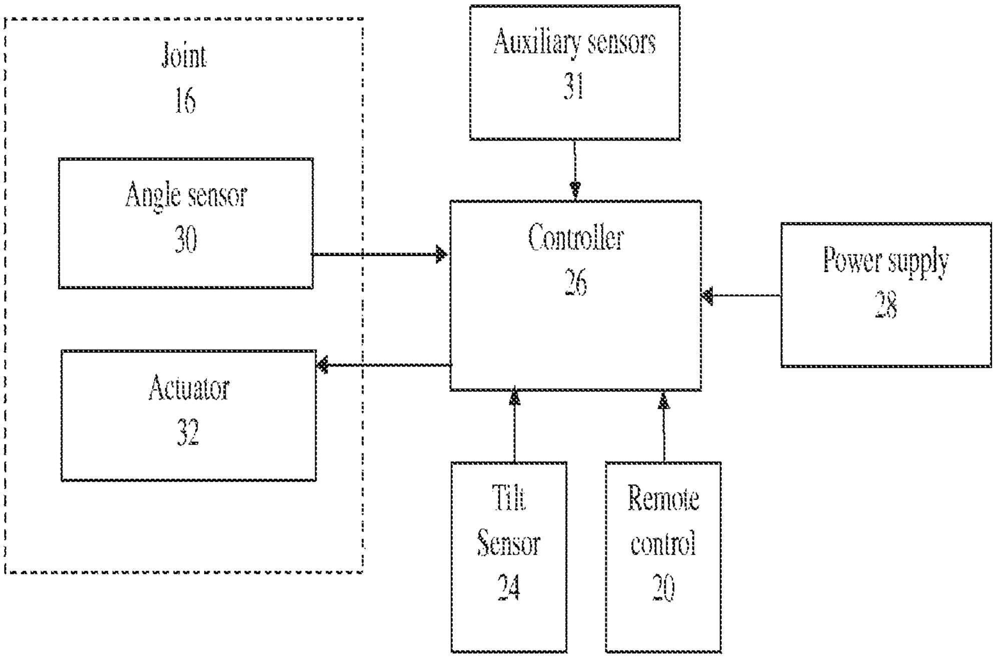
FIG. 1C is a block diagram of control of the apparatus shown in FIG. 1A.

FIG. 1A is a side view of a locomotion assisting exoskeleton device in accordance with some embodiments of the present invention. FIG. 1B is a front view of the apparatus shown in FIG. 1A. FIG. 1C is a block diagram of control of the apparatus shown in FIG. 1A.

Components of exoskeleton device 10 may be attached to the body of a user. For example, a trunk support 12 may attach to the user's lower torso above the pelvis. Leg segment braces 14 may each attach to a section of the user's leg. Bands or straps, such as straps 22, connected to trunk support 12 and leg segment braces 14, may at least partially wrap around parts of the user's body. Thus, straps 22 may ensure that each component brace of exoskeleton device 10 attaches to an appropriate corresponding part of the user's body. Thus, motion of the component brace may move the attached body part. Typically, components of exoskeleton device 10 may be adjustable so as to enable optimally fitting exoskeleton device 10 to the body of a specific user.

Component braces of exoskeleton device 10, such as trunk support 12 and leg segment braces 14, may connect to one another via joints 16. For example, two leg segment braces 14 may connect at knee joint 16*a*. A leg segment brace 14 and trunk support 12 may connect at hip joint 16*b*. Each joint 16 may include an actuator 32 for actuating relative angular motion between components connected by each joint 16.

Each actuator may be controlled by controller 26. For example, controller 26 may be located in backpack 18 of exoskeleton device 10. Alternatively, components of controller 26 may be incorporated into trunk support 12, leg segment braces 14, or other components of exoskeleton device 10. For example, controller 26 may include a plurality of intercommunicating electronic devices. The intercommunication may be wired or wireless. Similarly, communication between controller 26 and components of exoskeleton device 10, such as an actuator 32 or a sensor or control, may be wired or wireless.

Controller 26 may be powered by power supply 28. For example, power supply 28 may include one or more rechargeable batteries and appropriate electronic circuitry to enable recharging of the batteries (e.g. by connection to an external power supply). Power supply 28 may be located in backpack 18.

Each joint 16 may also be provided with an angle sensor 30 for sensing a relative angle between components connected by joint 16. An output signal from each angle sensor 30 may be communicated to controller 26. The output signal may indicate a current relative angle between connected components.

Tilt sensor 24 may be mounted on trunk support 12. Alternatively, tilt sensor 24 may be located on any other component of exoskeleton device 10 whose angle of tilt reflects the angle of tilt of the trunk support of exoskeleton device 10. An output signal from tilt sensor 24 may be communicated to controller 26. The output signal may indicate, for example, an angle between trunk support 12 and the vertical.

Exoskeleton device 10), in accordance with some embodiments of the present invention, may include one or more additional auxiliary sensors 31. For example, auxiliary sensors 31 may include one or more pressure-sensitive sensors. For example, a pressure-sensitive sensor may measure a ground force exerted on exoskeleton device 10. For example, a ground force sensor may be included in a surface designed for attachment to the bottom of the user's foot.

Exoskeleton device 10 may be provided with one or more controls for enabling user input or other external input. For example, exoskeleton device 10 may include a remote control set 20. Remote control set 20 may include one or more pushbuttons, switches, touch-pads, or other similar manually operated controls that a user may operate. Typically, remote control set 20 may include one or more controls for selecting a mode of operation. For example, operation of a control of remote control set 20 may generate an output signal for communication to controller 26. The communicated signal may indicate a user request to initiate or continue a mode of operation. For example, the communicated signal may indicate to the controller to initiate or continue a walking forward operation when appropriate sensor signals are received. As another example, remote control set 20 may include a control for turning exoskeleton device 10 on or off.

Typically, remote control set 20 may be designed for mounting in a location that is readily accessible by the user. For example, remote control set 20 may be provided with a band or strap. The strap may enable attaching remote control set 20 to the user's wrist or arm (as shown in FIGS. 1A and 1B). In this manner, remote control set 20) may be conveniently operated by fingers the arm opposite the arm on which it is mounted arm. Alternatively, remote control set 20, or part of it, may be mounted on a crutch, on the front of the user's torso, on the front of trunk support 12, or any other readily accessible location. Alternatively, remote control set 20) may include several detached controls, each communicating separately with controller 26 and each mounted at a separate location.

A locomotion assisting exoskeleton device in accordance with embodiments of the present invention may be operated to assist a disabled user to walk. For example, one or more joints 16 and leg segment braces 14 may be controlled so as to move the legs in a manner to enable a selected activity. For example, joints 16 and leg segment braces 14 may be manipulated in order to enable a user to walk. Control of a joint 16 may depend on previous actions performed and on input from at least an angle sensor 30 and tilt sensor 24.

Figure 2A:
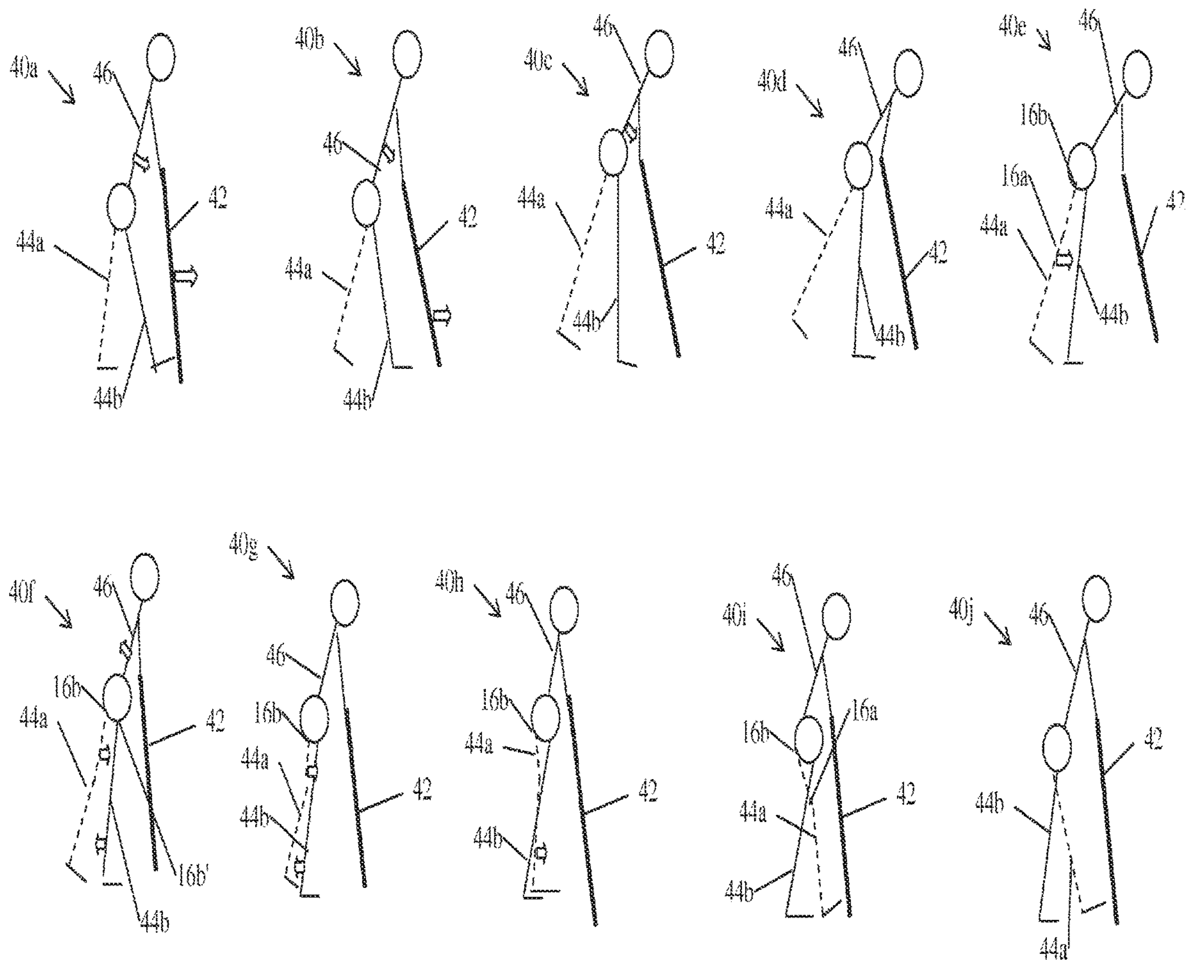
FIG. 2A schematically illustrates a method for controlling a locomotion assisting exoskeleton device in accordance with embodiments of the present invention to enable a user to take a step.
Figure 2B:
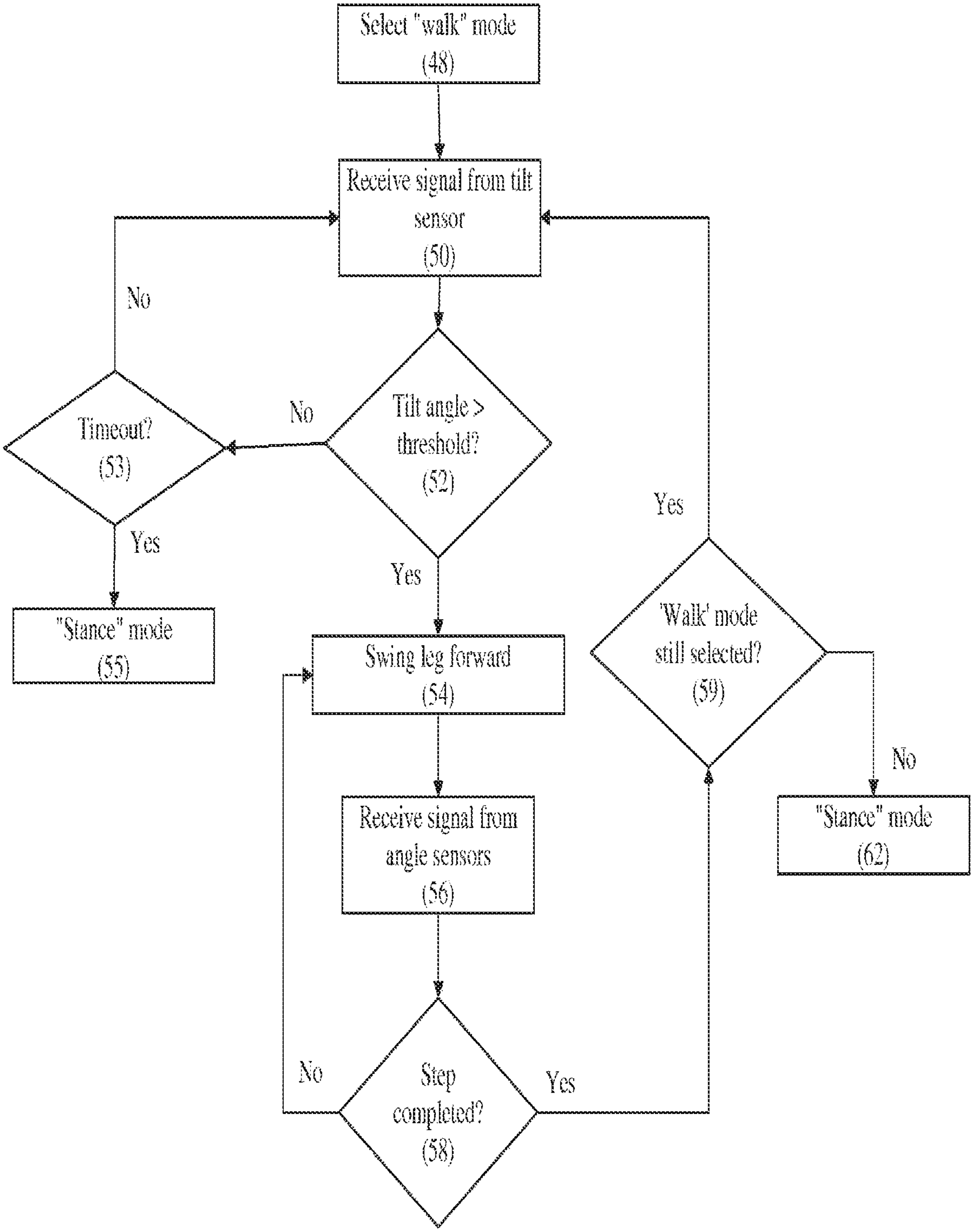
FIG. 2B is a flow chart of a method for taking a step, in accordance with embodiments of the present invention.

FIG. 2A schematically illustrates a method for controlling a locomotion assisting exoskeleton device in accordance with embodiments of the present invention to enable a user to take a step. FIG. 2B is a flow chart of a method for taking a step, in accordance with embodiments of the present invention. The illustrated method includes swinging leg 44*a*, which is initially (stage 40*a*) a trailing leg, forward. At the conclusion of the step (stage 40*j*), leg 44*a* is positioned ahead of initially leading leg 44*b*. The method may then be repeated with the legs 44*a* and 44*b* reversing their roles. The illustrated method assumes that the user is provided with, and is capable of manipulating, a pair of crutches. In the description below, reference is also made to components shown in FIGS. 1A-1C.

In order to be effectively assisted by the illustrated method, a user may require training and practice. For example, training may entail practice sessions using the exoskeleton device in conjunction with such other equipment as parallel bars or a walking frame. Various stages of a training program may teach a user how to maintain balance and how to walk when using the exoskeleton device. In addition, during the training program, a control program stored in a memory associated with controller 26 (FIG. 1C) may be adapted to a particular user. For example, a parameter indicating a threshold tilt angle or joint flexing angle may be adjusted in order to suit the capabilities or preferences of a particular user. The user may learn how to coordinate manipulation of the crutches with actions by the exoskeleton device in order to optimize effectiveness of the assisted walking.

For example, in stage 40*a* of the illustrated method, it is assumed that leg 44*b* is initially a leading leg, and leg 44*a* is initially a trailing leg. Both legs 44*a* and 44*b* are initially resting on the ground or other supporting surface, and both legs 44*a* and 44*b* approximately equally support the weight of the user's body. The user may signal a desire to walk forward, e.g. by operating a control of remote control 20 (step 48 of FIG. 2B). The user may initiate a step by moving crutches 42 forward. (Although crutches 42 are schematically illustrated in the form of a single line segment, it should be understood that typically a pair of crutches is referred to. The crutches, typically positioned on opposite sides of the user's body, are typically moved forward in parallel with one another.) As crutches 42 are moved forward, exoskeleton device 10, with the user, tilts forward.

During this time, the controller monitors tilt sensor 24 (step 50 of FIG. 2B) to determine whether the indicated tilt is sufficient (e.g. greater than a threshold tilt angle value) to enable swinging leg 44*a* forward (step 52). If the indicated tilt angle is not sufficient, a time of a timer may be compared with a threshold time (step 53). For example, a timer may start when operation of a control of remote control 20 indicates a desire to initiate a walk sequence, or when tilt sensor 24 indicates beginning to tilt. Alternatively, a plurality of timers (or timer functions) may monitor time elapsed from a plurality of trigger events. If an elapsed time indicates timing out, exoskeleton device 10 may initiate a sequence to exit from a walk mode (step 55). For example, exoskeleton device 10) may initiate a "standing stance" mode to bring the user to a standing position. Alternatively, operation may stop until a further control signal is received.

If a timeout is not sensed, monitoring of tilt signals continues (returning to step 50).

In stage 40*b*, the user continues to move crutches 42 forward, and exoskeleton device, 10 with the user, continues to tilt forward. The weight of the user's body begins to shift toward leg 44*b*, which is a leading leg.

In stage 40*c*, crutches 42 are in a forward position. The user's elbows begin to bend so as to enable exoskeleton device 10 to continue to tilt forward. Leg 44*a* begins to be raised so as to discontinue contact with the ground. The weight of the user's body is now supported by leg 44*b* and crutches 42.

In stage 40*d*, continued bending of the user's elbow may cause exoskeleton device 10 to tilt forward sufficiently to trigger exoskeleton device 10 to initiate a step. For example, at this point, a tilt sensor 24 may generate a tilt signal. The generated tilt signal may be processed (e.g. by controller 26) to indicate that the tilt angle of exoskeleton device 10 is equal or greater than a threshold angle. A tilt angle equal to the threshold angle may trigger initiation of a step sequence (step 52). Controller 26 may then, upon receiving the generated tilt signal, initiate a control program to operate exoskeleton device 10 so as to start a step by swinging leg 44*a* forward.

In stage 40*e*, exoskeleton device 10 begins to swing leg 44*a* forward. For example, controller 26 may cause knee joint 16*a* of leg 44*a* to flex by a predetermined angle. Concurrently, controller 26 may cause hip joint 16*b* of leg 44*a* to begin flexing forward, thus swinging leg 44*a* forward (step 54). During motion of leg 44*a*, controller 26 may monitor output signals of one or more angle sensors 30 (step 56) to verify that leg 44*a* is moving in accordance with predetermined criteria. Monitoring of the output signal may also indicate whether the step is complete, or whether to continue forward motion of leg 44*a* (step 58).

In stage 40*f*, exoskeleton device 10 continues to swing leg 44*a* forward. For example, controller 26 may continue to flex hip joint 16*b* of leg 44*a* so as to swing leg 44*a* forward. Concurrently, hip joint 16*b*' of leg 44*b* extends to raise the trunk 46 towards an upright position (similar to its position in stage 40*a*). The user may push downward on crutches 42 in order to help this operation.

In stage 40*g*, exoskeleton device 10 continues to move leg 44*a* forward and 44*b* backward to as to approach each other. For example, controller 26 may continue to operate hip joint 16*b* of leg 44*a* so as to swing leg 44*a* forward, and hip joint 10*b*' and of leg 44*b* to extend and straighten leg 44*b*.

In stage 40*h*, exoskeleton device 10 continues to move leg 44*a* forward ahead of leg 44*b* and to extend leg 44*b*. For example, controller 26 may continue to operate hip joint 16*b* of leg 44*a* so as to swing leg 44*a* forward and hip joint 10*b*' of leg 44*b* to straighten leg 44*b*.

In stage 40*i*, exoskeleton device 10 continues to move leg 44*a* forward and leg 44*b* backward. For example, controller 26 may continue to operate hip joint 16*b* of leg 44*a* and extend hip joint 16*b*' of leg 44*b* so as to swing leg 44*a* forward. Concurrently, exoskeleton device 10 may extend knee joint 16*a* to straighten leg 44*a*. For example, controller 26 may receive a signal from angle sensors 30 of hip joints 16*b* and 16*b*'. The sensed signal may indicate that a sensed angle is within a predetermined range of angles indicating a completed step (step 58). Controller 26 may then operate knee joint 16*a* of leg 44*a* so as to extend and straighten leg 44*a*. During the straightening operation, controller 26 may monitor signals from angle sensors 30 of knee joint 16*a* of leg 44*a* to verify when the leg is sufficiently straight so as to stop operation of knee joint 16*a*.

In stage 40*j*, leg 44*a* is extended forward and is a leading leg, while leg 44*b* is a trailing leg. Thus, stage 40*j* is essentially identical to stage 40*a*, with the roles of legs 44*a* and 44*b* reversed. Thus, exoskeleton device 10) has performed a single step. If the walk mode is still selected (step 59), stages 40*a*-40*j* may be repeated, with the roles of legs 44*a* and 446 reversed (return to step 50). Continued operation in this manner may enable a user to whom exoskeleton device 10 is attached to walk.

If walk mode is no longer selected, the walking operation may stop. For example, exoskeleton device 10 may cause the user to change to a standing stance (step 60). Alternatively, the device may stop operation and ignore any further tilt signals.

As discussed above, a user may practice walking with exoskeleton device 10 in order learn to coordinate body movements and crutches movements with operation of exoskeleton device 10. For example, a training program may begin with practicing balance and walking using exoskeleton device 10 between parallel bars. The user may then progress to learning to balance using exoskeleton device 10 with crutches or a walking frame. Finally, the user may practice walking using exoskeleton device 10 and crutches, so as to execute the method illustrated in FIG. 2A.

In accordance with some embodiments of the present invention, an operation method may include monitoring a signal generated by tilt sensor 24 in conjunction with signals generated by one or more angle sensors 30. For example, the signals may indicate an unexpected configuration or combination of sensor readings. In this case, controller 26 may execute one or more activities to verify proper operation or to prevent further unexpected situations. For example, controller 26 may generate an audible, visible, or palpable alert to the user, using an appropriate warning device. Concurrently, controller 26 may pause or stop operation of exoskeleton device 10 until receiving a confirmation signal from the user. For example, the user may operate remote control 20 to indicate continuation of an operation, or alternatively, aborting an operation. When aborting an operation, controller 26 may operate exoskeleton device 10 so as to assist in maintaining the stability of the user. Similarly, if the generated signals are consistent with an emergency situation, such as falling, controller 26 may operate exoskeleton device 10 in a predetermined manner so as to minimize any risk of injury to the user.

In accordance with some embodiments of the present invention, exoskeleton device 10 may be provided with one or more ground force sensors. For example, a ground force sensor may be located on a foot support designed to support a foot of the user. For example, execution of an operation by exoskeleton device 10 may be dependent on receiving one or more predetermined signals from the ground force sensors.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A locomotion assisting exoskeleton device comprising:
a trunk support for affixing to the part of the torso of a person
- a pair of leg segment braces, each leg segment brace for connecting to a section of a leg of the person, wherein:
  - each leg segment brace having a joint including an angle sensor and an actuator, the joint for connecting a respective leg segment brace to the trunk support and for providing relative angular movement therebetween;
- a tilt sensor mounted on the exoskeleton device for sensing an indicated tilt of the trunk support; and
- a controller for receiving sensed signals from the tilt sensor and each angle sensor, and programmed with an algorithm with instructions for actuating the joints m accordance with the sensed signals,
- wherein the algorithm comprises:
  - monitoring the tilt sensor to determine whether the indicated tilt being equal to or greater than a first threshold value, and
  - upon the indicated tilt being greater than the first threshold value, initiating a step sequence of a walking mode, or if the first threshold value has not been met, exiting the walking mode, the step sequence comprises:
operating a first of the joints to swing a first trailing leg forward,
monitoring the angle sensor of the first of the joints to verify that the swung forward leg is moving in accordance with predetermined criteria or whether the step is complete or to continue forward motion of the leg, and
operating a second of the joints to extend a second leading leg backward so as to raise the truck support towards an upright position.

2. The device of claim 1, wherein the step sequence further comprises halting forward motion of the first leg upon an angle sensed by the angle sensor of the first joint being within a predetermined range of angles.

3. The device of claim 1, wherein extension of the second leading leg backward occurs when the sensed tilt exceeds a second threshold value.

4. The device of claim 1, wherein exiting the walking mode comprises initiating a standing mode to bring the user to a standing position, or ceasing the step sequence.

5. The device of claim 1, further comprising a remote control.

6. The device of claim 1, wherein the tilt sensor is mounted on the trunk support.

7. The device of claim 1, wherein the tilt sensor is mounted on a component of the exoskeleton device and the corresponding tilt of the tilt sensor is approximately equal to the tilt of the trunk support.

8. The device of claim 1, wherein the controller is further configured to determine an angle based on the signals.

9. A device of claim 1, further comprising a timer configured to determine an amount of time to compare to one or more time periods for performing one and/or another algorithm steps.

10. A method for operating an exoskeleton device comprising:
monitoring a tilt sensor to determine whether an indicated tilt is equal to or greater than a threshold, and
upon the indicated tilt being greater than the threshold, initiating a step sequence, or if the threshold has not been met, exiting a walking mode, the step sequence comprising:
operating a first motorized joint of the exoskeleton device to swing a first trailing leg forward;
monitoring an angle sensor of the first of the motorized joints to verify that the swung forward leg is moving in accordance with predetermined criteria, or whether the step is complete or to continue forward motion of the leg;
operating a second motorized joint to extend a second leading leg backward so as to raise the truck support towards an upright position;
halting forward motion of the first leg upon an angle sensed by the angle sensor of the first motorized joint being within a predetermined range of angles, and
determining an angle based on sensor signals.

11. The method of claim 10, wherein extension of the second leading leg backward occurs when the sensed tilt exceeds a threshold value.

12. The method of claim 10, wherein exiting the walking mode comprises initiating a standing stance mode to bring the user to a standing position, or ceasing the step sequence.

13. The method of claim 10, further comprising controlling the exoskeleton device via a remote control.

14. The method of claim 10, wherein the tilt sensor is mounted on a trunk support of the exoskeleton device.

15. The method of claim 10, wherein the tilt sensor is mounted on a component of the exoskeleton device and the corresponding tilt of the tilt sensor is approximately equal to the tilt of the trunk support.

* * * * *